R. J. STOKES.
DISK FOR FLEXIBLE COUPLINGS AND PROCESS OF MAKING SAME.
APPLICATION FILED MAY 26, 1919.
1,346,612. Patented July 13, 1920.
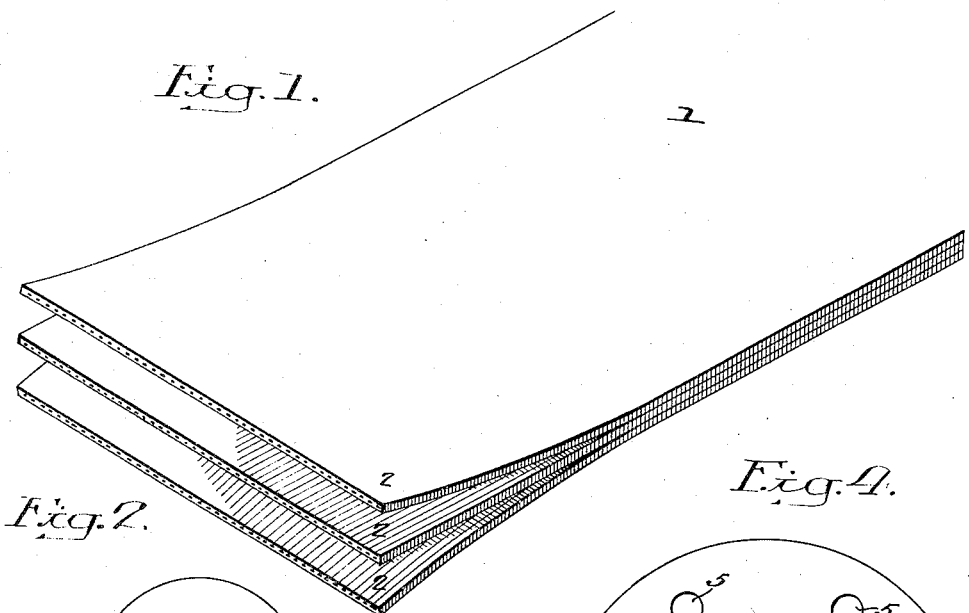
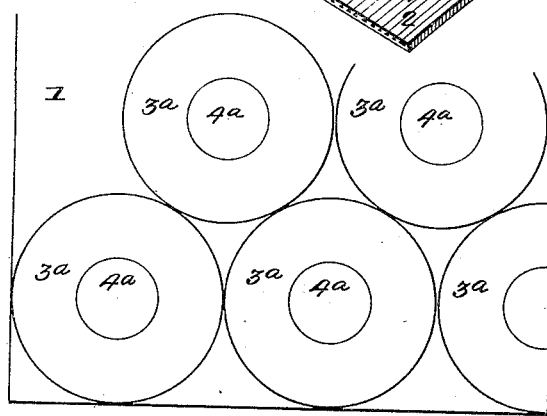
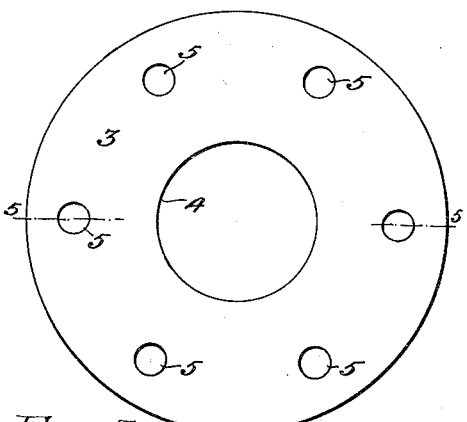
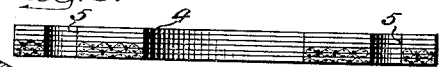
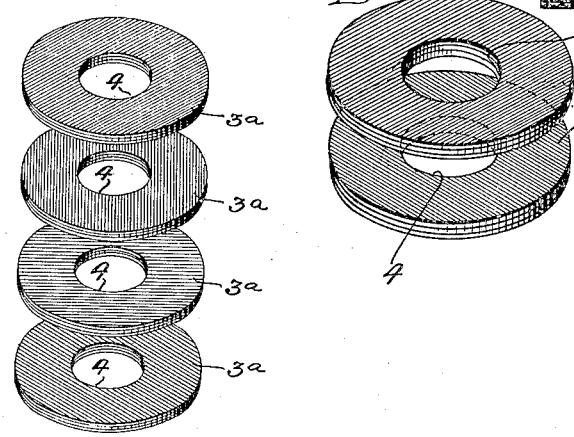
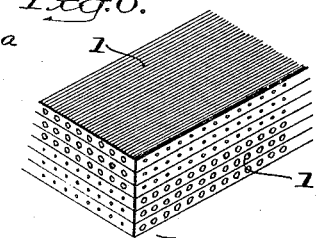
Inventor,
Robert J. Stokes,
by his Attorneys,

UNITED STATES PATENT OFFICE.

ROBERT J. STOKES, OF TRENTON, NEW JERSEY, ASSIGNOR TO THERMOID RUBBER COMPANY, OF HAMILTON TOWNSHIP, NEW JERSEY, A CORPORATION OF NEW JERSEY.

DISK FOR FLEXIBLE COUPLINGS AND PROCESS OF MAKING SAME.

1,346,612.  Specification of Letters Patent.  Patented July 13, 1920.

Application filed May 26, 1919. Serial No. 299,957.

*To all whom it may concern:*

Be it known that I, ROBERT J. STOKES, a citizen of the United States, and a resident of Trenton, county of Mercer, State of New Jersey, have invented certain Disks for Flexible Couplings and Processes of Making Same, of which the following is a specification.

My invention relates to certain improvements in the disks of flexible couplings, which are made of canvas, or other fabric, and rubber, and through which the power is transmitted.

In a patent granted to E. J. Hardy on the 22nd day of February, 1916, No. 1,172,988, a disk is shown in which the different layers of fabric are placed one upon another and cemented together by a rubber composition so that the warp threads radiate substantially in all directions from the center of the disk. This makes a very substantial disk and one which will withstand the severe strains to which a coupling is subjected, but the cost of manufacture is great, owing to the fact that the different pieces of fabric forming the disk have to be separately assembled and, consequently, there is considerable waste.

One object of the present invention is to cheapen the manufacture of a disk of this type and at the same time to arrange the sections so that some of the warps will run in one direction, while others will run in a direction at an angle to the first set.

A further object of the invention is to make the disks from sheet material, which can be made of several plies punched and quickly assembled with a minimum amount of waste.

In the accompanying drawings:

Figure 1 is a perspective view of one sheet having three plies from which the disks are made;

Fig. 2 is a plan view, showing a method of cutting the disks from the sheet;

Fig. 3 is a perspective view showing the two sections of the disk ready to be assembled and secured together;

Fig. 4 is a view of one of the finished disks;

Fig. 5 is a sectional view on the line 5—5, Fig. 4;

Fig. 6 is an enlarged diagrammatic view of a portion of the disk showing the layers of fabric; and Fig. 7 is a view of the four sections which make up a disk.

The material from which the disks are made is canvas impregnated with rubber. The warp threads are usually much stronger than the weft threads. The sheet 1, Fig. 1, in the present instance, consists of three single fabric strips 2 which have been impregnated with rubber. These strips are pressed together, as shown in Fig. 1, and partly cured or vulcanized. They are then cut, as indicated in Fig. 2, to form the disks 3 with the center section $4^a$ cut out to form the opening 4. The cuttings $4^a$ of the disk can be used for other disks and washers, as desired. The holes 5 for the bolts may be punched at the same time or afterward. This method of cutting the sections $3^a$ of the disks 3 directly from the sheet of material eliminates waste and the time consumed in handling the material is greatly reduced.

The partially cured sections $3^a$ are then assembled in pairs, as shown in Fig. 3, with the warps of one section arranged at an angle to those of the other section, preferably at right angles. Then the two sections are placed in a mold and the vulcanization is completed. This makes a disk, such as shown in Figs. 4 and 5, in which one-half of the warps are extending in one direction and the other half in a direction at an angle to the first mentioned warps so that when the disks are subjected to strains one set of warps will reinforce the weaker portions of the other section of the disk, making a very substantial and cheaply manufactured disk, especially adapted for use in flexible couplings for driving machine elements.

In some instances, where a much stronger disk is desired, three, four, or more sections $3^a$ can be assembled and, in this instance, the disks are so proportioned that the warps cross each other, as clearly shown in Fig. 7. While I have indicated a three-ply fabric, as illustrated in Fig. 1, in which the warps run in the same direction, the fabric may be of as many plies as desired, depending upon the character of the coupling and the amount of power to be transmitted through the disks.

By partially curing the fabric while in the sheet, it can be readily handled and the curing can be completed when the sections of the disks are assembled and in the mold, making a finished article of manufacture in which the sections are firmly united.

It will be understood that the disks after the bolt holes 5 are punched, are sold separately, or in sets, to be applied to a flexible coupling. A coupling usually consists of a series of these disks spaced apart and attached to spiders, one spider being secured to the driving shaft and the other spider being secured to the driven shaft. The power is transmitted through these shafts. As the disks are made of flexible material, they allow the two shafts a certain amount of lateral movement, as well as longitudinal movement.

In some instances, the disks can be assembled without being partially vulcanized and the assembled disks can be vulcanized in one operation.

I claim:

1. The process herein described of making transmission disks for flexible couplings, said process consisting in first making a rubberized, impregnated multiply fabric in which the several plies run in the same direction, then cutting the disk sections from the fabric and so assembling the sections that the warp threads of one section will be at an angle to the warp threads of another section, then clamping the two sections in a mold and vulcanizing, or curing, the assembled disk sections so as to make a composite transmission disk in which some of the warp threads are arranged at an angle to other warp threads.

2. The process herein described of making transmission disks for flexible couplings, said process consisting in first making a rubberized, impregnated multiply fabric in which the plies run in the same direction, partially curing the fabric, then cutting disk sections from the multiply fabric and so assembling the sections that the warp threads of one section will be at an angle to the warp threads of another section, then clamping the two sections in a mold and completing the vulcanizing, or curing, of the assembled disk sections so as to make a composite transmission disk in which some of the warp threads are arranged at an angle to other warp threads.

3. The process herein described of making a transmission disk for flexible couplings, said process consisting in first taking three single sheets of fabric, impregnating each sheet with a rubber composition, then uniting the three sheets so as to form a single multiply sheet, partially vulcanizing said single multiply sheet, then cutting a series of disk sections from said sheet, then clamping the two sections in a mold with the warp threads, of one section arranged at an angle in respect to the warp threads of another section, and completing the vulcanization of the disk thus formed, so uniting the two sections that when subjected to strains there will be substantial uniformity of strength.

4. A transmission disk for flexible couplings made of two disk sections, each disk section consisting of a series of sheets of fabric in which the warps run in the same direction, the fabric being impregnated with rubber and in which the warp threads of one disk section are at an angle to those of the other disk section.

ROBERT J. STOKES.